United States Patent Office 2,715,952
Patented Aug. 23, 1955

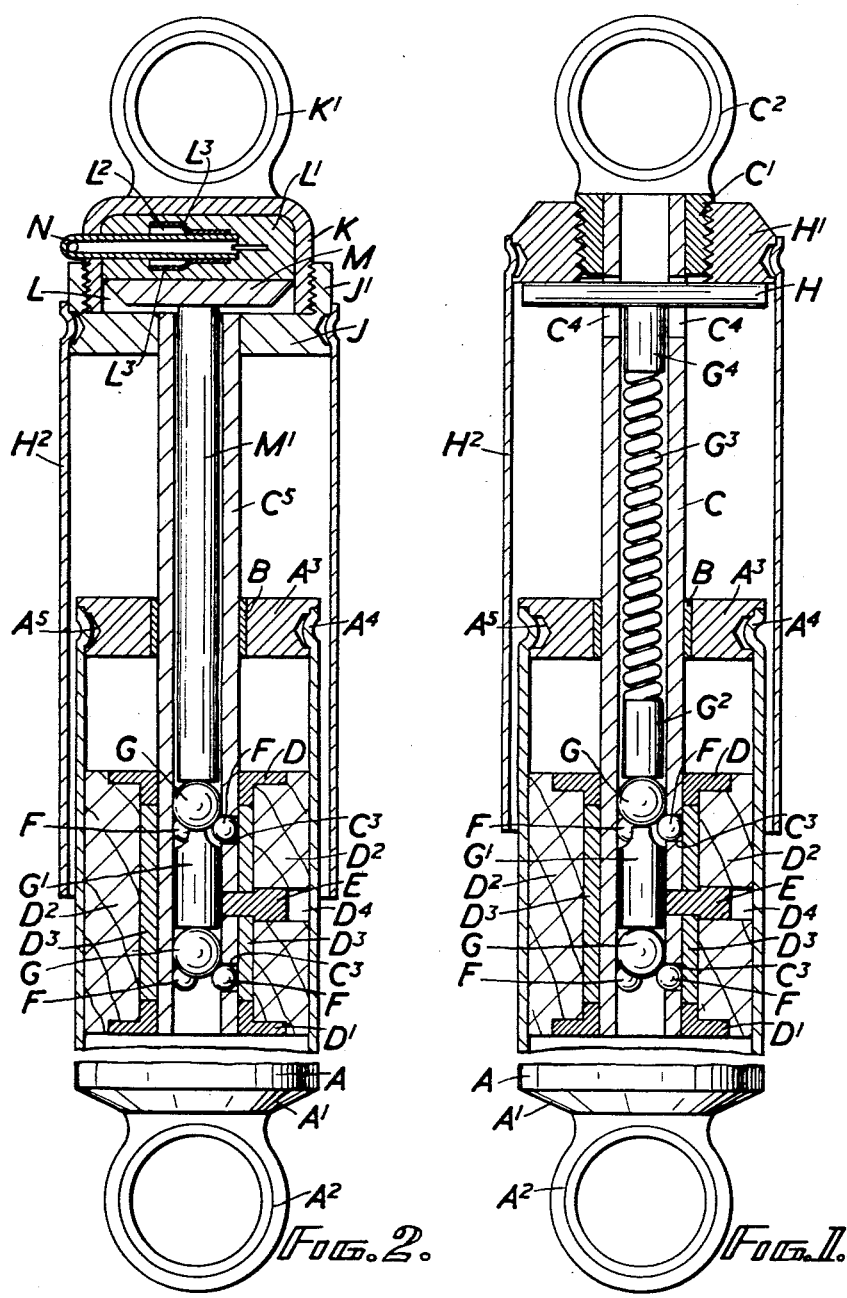

2,715,952
VIBRATION DAMPERS

Leonard Henry Barnett, Putney, London, England, assignor to Jonas Woodhead & Sons Limited, Leeds, England, a company of Great Britain Application December 21, 1953, Serial No. 399,377
Claims priority, application Great Britain January 1, 1953
6 Claims. (Cl. 188—129)

This invention relates to vibration dampers, as commonly used for example in association with the suspension systems of motor road vehicles to damp out and prevent oscillating movement between the sprung and unsprung parts of the vehicle.

The invention is concerned with vibration dampers of the friction type and of the kind comprising a cylinder adapted to be secured to one of the two elements between which relative movement is to be resisted and a piston-like member (hereinafter called for convenience the piston member) mounted to slide within and having frictional engagement with the cylinder and arranged to be connected by a rod (hereinafter for convenience called the piston rod) to the other of the two elements between which relative movement is to be resisted so that, when relative movement takes place between the two elements in question, e. g. between the sprung and unsprung parts of a road vehicle, the piston member reciprocates within the cylinder and by its frictional engagement therewith resists such relative movement.

An object of the present invention is to provide a simple and effective construction of vibration damper of the above kind in which the frictional resistance to movement between the piston member and the cylinder can readily be adjusted to a required value and will tend to remain consistent for any such adjustment while at the same time the force necessary to start relative movement between the piston and cylinder will not exceed greatly that necessary to maintain such relative movement when once started.

A vibration damper of the kind referred to according to the present invention comprises a cylinder, a piston member including one or more radially expandible or movable friction elements, a piston rod the inner end of which is connected to the piston member in a manner such that the force applied to the piston member by the rod does not produce any substantial radial force tending to force the friction element or elements into frictional engagement with the cylinder, means for applying a radial force to the friction element or elements to maintain it or them in frictional engagement with the cylinder, and control means extending from the outer end of the piston rod along its bore and acting on the means for applying the said radial force, such control means being capable of adjustment to vary the radial force applied to the friction element or elements.

Preferably the means for applying the radial force to the friction element or elements comprises one or more actuating members which are mounted to move longitudinally within the part of the piston rod adjacent to the piston member and when so moved exert through suitable thrust transmitting members a radial force upon the friction element or elements and in this case the control means include a control member the inner end of which applies an axial force to such actuating member or members while its outer end is acted upon by adjustable thrust-producing means imposing thereon an axial force.

For example the adjustable thrust-producing means may comprise a helical compression spring the outer end of which bears upon an adjustable abutment, or a fluid chamber having a flexible wall which bears upon the outer end of the actuating member and has associated with it means for varying the fluid pressure within it.

In some cases a single radially expansible friction element might be provided but it will generally be preferred to provide two or more friction elements circumferentially spaced around the piston member and together forming a nearly complete cylindrical friction surface, a convenient arrangement comprising three such friction elements.

Moreover the thrust transmitting members may conveniently be in the form of balls located within holes passing radially through the wall of the piston rod and with their outer portions acting on the friction elements while their inner portions, which project into the bore of the piston rod are acted upon by one or more actuating members also in the form of balls situated and longitudinaly movable within the bore of the piston rod and arranged to have an axial force applied to them.

The details of construction may vary but two alternative constructions according to the invention are illustrated by way of example in the accompanying drawing in which Figure 1 is a cross section in a plane containing the axis of the vibration damper as a whole of a construction incorporating manually adjusting means, and Figure 2 is a similar view to Figure 1 of a construction embodying hydraulically controlled adjusting means.

In the construction shown in Figure 1 the vibration damper comprises a cylinder A, assumed to be vertical, the lower end of which is formed integral with or rigidly secured to an end cap $A^1$ having formed integral with it a transverse socket $A^2$ by which it can be pivotally connected to one of the two elements between which relative movement is to be resisted by the vibration damper, e. g. to the axle or other unsprung part of a vehicle. Rigidly secured within the upper end of the cylinder A is an annular guide member $A^3$ secured to the cylinder A by spinning a portion $A^4$ of the cylinder into a groove $A^5$ in the guide member $A^3$. Rigidly mounted within the bore of the guide member is a bushing B of some suitable anti-friction or bearing metal.

Passing through the bushing B is a tubular piston rod C which is capable of sliding through the bushing B and has rigidly secured to its upper end an externally screw-threaded boss $C^1$ having formed integral with it a transverse socket $C^2$ similar to the socket $A^2$ and by which the upper end of the piston rod C can thus be pivotally connected to the other of the two elements between which relative movement is to be resisted, e. g. to the sprung part of a vehicle.

Mounted on the lower end of the piston rod C is a piston member comprising spaced upper and lower flange-like end caps D and $D^1$ rigidly secured as by brazing to the piston rod C, between which end caps D, $D^1$ are mounted three similar arcuate friction elements equally circumferentially spaced about the axis of the piston rod and together forming a substantially complete cylinder, each friction element comprising an arcuate friction block $D^2$ of treated wood and an arcuate metallic thrust piece or liner $D^3$ lying adjacent to the piston rod C. Formed in one of the blocks $D^2$ and its associated thrust piece $D^3$ is a radial hole $D^4$ in which is located freely the outer portion of a pin E the inner end of which is rigidly mounted, as by brazing, in a radial hole in the piston rod C so that the pin E permits the necessary radial movement of the friction element $D^2$ $D^3$ in question but retains the three friction elements $D^2$ $D^3$ in approximately fixed circumferential positions relatively to the piston rod C.

Formed in the part of the piston rod C adjacent to the upper and lower ends of the thrust members $D^2$ are radial holes $C^3$ each of such holes being approximately equally spaced from the two vertical edges of its associated arcuate thrust member $D^3$. Lying freely but closely within each of the holes $C^3$ is a thrust ball F constituting a radial thrust member the outer portion of which acts on the appropriate thrust piece $D^3$ while its inner portion projects somewhat within the bore of the piston rod C. Arranged within the piston rod C so as to be longitudinally movable therein and to act upon the inner portions of the thrust balls F are two larger balls G between which lies a longitudinally movable thrust or distance piece $G^1$ of such dimensions that if a downward pressure be applied to the upper ball G the two balls G tend to force their associated thrust balls F outwards approximately equally.

Arranged to act upon the upper ball G is thrust transmitting mechanism constituting control means and comprising a thrust member or rod $G^2$ the lower end of which acts on the upper ball G while its upper end is acted upon by a helical compression spring $G^3$ the upper end of which in turn bears against the lower end of the axially movable thrust member $G^4$. The upper end of the thrust member $G^4$ bears against the centre of a transverse pin H extending through slots $C^4$ in the piston rod C so as to be axially movable relatively thereto and acted upon at its ends by a thrust collar $H^1$ screwed upon the boss $C^1$. The thrust collar $H^1$ moreover has rigidly secured thereto a cylindrical shroud $H^2$ which extends downwards freely around the upper end of the cylinder A for the purpose of preventing the entry of dust and dirt into the space above the guide member $A^3$, in which the piston rod C operates.

It will be apparent that the axial force applied by the spring $G^3$ through the member $G^2$ to the upper ball G and hence through the member $G^1$ to the lower ball G will be transmitted through the thrust balls F in the holes $C^3$ in a radial direction to the friction elements $D^2$, $D^3$ and that by rotating the collar $H^1$ on the boss $C^1$ the compression of the spring $G^3$ and hence the radial force applied to the friction elements $D^2$ $D^3$ and the resistance which they impose to relative movement between the cylinder A and the piston rod C can be adjusted.

In the alternative construction illustrated in Figure 2 the general construction of the cylinder A and its associated parts and of the piston member D, $D^1$, $D^2$, $D^3$ and the arrangement and operation of the balls G and F and of the distance piece $G^1$ are precisely the same as in Figure 1 and will not therefore again be described. In the construction shown in Figure 2, however, a piston rod $C^5$ is provided similar to the piston rod C except that it has no slots $C^4$ and its upper end is rigidly secured to an annular cap member J to which the tubular shroud $H^2$ is rigidly secured. The cap J has an upwardly extending internally screwthreaded rim $J^1$ within which is screwed the lower end of an inverted cup like member K so as to form with the member J, $J^1$ a shallow cylindrical chamber L. A socket $K^1$ having the same function as the socket $C^2$ in Figure 1 is formed integral with the member K while mounted within the chamber L is a flexible chamber $L^1$ formed for example of rubber and having within it a pressure space $L^2$ the upper and lower walls of which may be reinforced by metal plates $L^3$ bonded to the rubber. The upper face of the rubber chamber $L^1$ bears against the upper wall of the chamber L while its lower face bears upon the upper face of a disc M rigidly secured to the upper end of a thrust rod $M^1$ which extends freely downwards into the connecting rod $C^5$ and engages the upper ball G. A pipe N extends and opens into the space $L^2$ and is arranged to be connected in known manner to adjustable hydraulic pressure mechanism by which an adjustable hydraulic pressure can be maintained in this space.

In this construction it will be apparent that the hydraulic pressure in the space $L^2$ acts through the member M and the thrust rod $M^1$ on the upper ball G and hence through the member $G^1$ on the lower ball G so as to cause the friction elements $D^2$ $D^3$ to be forced radially outwards by the balls F and that the force so applied can be varied by controlling the hydraulic pressure in the space $L^2$.

Since frictional vibration dampers having pressure chambers the pressure in which maintains frictional elements in contact and can be varied by manually or automatically operated hydraulic pressure mechanism are well known and the hydraulic pressure mechanism in itself forms no part of the present invention this mechanism has, for convenience, not been illustrated.

What I claim as my invention and desire to secure by Letters Patent is:

1. A vibration damper of the kind referred to comprising a cylinder member, a piston member including at least one radially displaceable friction element, a piston rod axially movable relatively to the cylinder member, locating parts projecting radially from the piston rod and having radial surfaces engaging corresponding surfaces of the friction element to locate the friction element relatively to the piston rod, permit radial displacement of the friction element relatively to the piston rod but to exert no radial force on the friction element by reason of axial forces transmitted from the piston rod to the friction element through the locating parts, means for applying a radial force to the friction element to maintain said element in frictional engagement with the cylinder, and control means extending from the outer end of the piston rod along its bore for varying the radial force applied by said control means to said friction element.

2. A vibration damper as claimed in claim 1 in which the means for applying the radial force to the friction element comprises at least one actuating member movable longitudinally within the piston rod, and pressure members operable by said actuating member to exert a radial force upon the friction element, said control means including a control member applying an axial force to such actuating member.

3. A vibration damper as claimed in claim 2 in which the pressure members comprise balls lying and radially movable in holes in the wall of the piston rod with their outer portions acting upon the friction element while their inner portions are acted upon by said actuating member, said actuating member comprising an axially movable ball arranged within the piston rod.

4. A vibration damper as claimed in claim 3 in which two axially spaced sets of radially movable balls are arranged in axially spaced sets of holes in the piston rod, each set of radially movable balls being acted upon by an axially movable ball disposed within the piston rod while a distance piece is provided between the two axially movable balls, such as to cause them to move similarly when a thrust in the appropriate direction is applied to the appropriate one of them by the control member.

5. A vibration damper as claimed in claim 4 in which the control member comprises a helical compression spring, the inner end of which acts upon the axially movable balls while its outer end is acted upon by a thrust member arranged to be moved longitudinally relative to the piston rod by adjusting mechanism.

6. A vibration damper as claimed in claim 4 in which the control member comprises a rod and the adjusting means comprises a fluid chamber having a flexible wall acting to impose a thrust upon the rod and pressure mechanism for subjecting the interior of the fluid chamber to a variable fluid pressure.

References Cited in the file of this patent

UNITED STATES PATENTS 2,404,666     Snyder                July 23, 1946

FOREIGN PATENTS 281,347     Italy                   Jan. 10, 1931